(12) United States Patent
Halalay et al.

(10) Patent No.: US 8,557,485 B2
(45) Date of Patent: Oct. 15, 2013

(54) TUNGSTEN-CONTAINING HYDROGEN-STORAGE MATERIALS FOR ANODES OF PEM FUEL CELLS

(75) Inventors: Ion C. Halalay, Grosse Pointe Park, MI (US); Belabbes Merzougui, Manchester, CT (US); Gregory C. Garabedian, Warren, MI (US); Michael P. Balogh, Novi, MI (US); Swathy Swathirajan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 839 days.

(21) Appl. No.: 12/332,440

(22) Filed: Dec. 11, 2008

(65) Prior Publication Data

US 2010/0151295 A1 Jun. 17, 2010

(51) Int. Cl.
*H01M 4/02* (2006.01)
(52) U.S. Cl.
USPC .......................... 429/532; 429/523; 429/524
(58) Field of Classification Search
USPC .......................................... 429/523, 524, 532
See application file for complete search history.

(56) References Cited

U.S. PATENT DOCUMENTS

| 5,763,113 | A | 6/1998 | Meltser et al. |
| 6,828,056 | B2 * | 12/2004 | Molter et al. ................. 429/484 |
| 2006/0188768 | A1 * | 8/2006 | Kanaoka et al. ................ 429/33 |
| 2006/0240312 | A1 | 10/2006 | Xie et al. |
| 2006/0251954 | A1 * | 11/2006 | Merzougui et al. ............ 429/44 |
| 2007/0202386 | A1 * | 8/2007 | Matsuoka et al. .............. 429/40 |
| 2008/0118818 | A1 * | 5/2008 | Merzougui et al. ............ 429/44 |
| 2008/0166599 | A1 | 7/2008 | Swathirajan et al. |

* cited by examiner

*Primary Examiner* — Zachary Best
(74) *Attorney, Agent, or Firm* — Reising Ethington P.C.

(57) ABSTRACT

The incorporation of tungsten-containing hydrogen spillover materials into a composite fuel cell anode can be helpful in preserving the carbon catalyst support materials in the fuel cell cathode during periods of hydrogen starvation. Preferred examples of such tungsten-containing hydrogen spillover materials are tungsten oxides and tungsten silicides. These materials, when physically mixed with catalyst-loaded carbon support particles in a composite anode, have shown the ability to promote hydrogen storage in amounts that, during a disruption of hydrogen gas flow, can postpone an anodic potential excursion into the oxygen evolution region for a period of at least several seconds.

5 Claims, 10 Drawing Sheets

TUNGSTEN-CONTAINING HYDROGEN-STORAGE MATERIALS FOR ANODES OF PEM FUEL CELLS

TECHNICAL FIELD

This invention relates to the selection of anode materials for mitigating hydrogen starvation effects in a hydrogen-consuming fuel cell using a proton exchange membrane (PEM). More specifically, the present invention relates to the use of tungsten compound-containing hydrogen spillover materials mixed with an anode catalyst material to delay the onset of performance degradation of the cathode during temporary hydrogen starvation.

BACKGROUND OF THE INVENTION

Proton exchange membrane (PEM) fuel cells are largely considered the main fuel cell technology candidate for, among others, portable and automotive transportation applications. A typical PEM fuel cell generally includes a membrane electrode assembly (MEA), a pair of gas diffusive backing layers positioned adjacent to each side of the MEA, and a pair of current-collecting flow plates positioned adjacent to each backing layer. The MEA, which is further composed of a solid polymer electrolyte membrane having an anode on one of its faces and a cathode on the opposite face, is the PEM fuel cell's main source of electrochemical activity where a usable electrical current that flows from the anode to the cathode is generated and intermittently utilized to power an external device. Such electrochemical activity is the result of catalyst-driven oxidation and reduction reactions that occur when a fuel is supplied to the anode side of the MEA and an oxidant is supplied to the cathode side. In many instances a large number of PEM fuel cells may be assembled in series to form what is known as a fuel cell stack to generate greater electrical current outputs. For example, stack arrangements of PEM fuel cells can generate a cumulative electrical current output capable of powering automotive devices such as electrical motors and certain auxiliary fuel cell stack equipment. Typical arrangements of multiple cells in a stack are described in U.S. Pat. No. 5,763,113, assigned to General Motors Corporation.

The solid polymer electrolyte membrane of the MEA may be formed from a proton conductive and electrically insulative polymer material. The membrane can thus provide a conductive pathway for ion transport between the anode and the cathode, can direct the flow of an electrical current through an external device in order for that current to travel from the anode to the cathode and thus complete the electrochemical cell, and separate the reactant gases supplied to the anode and the cathode. A popular polymer material used to make the solid polymer electrolyte membrane of a PEM fuel cell is a perfluorosulfonic acid ionomer such as, for example, those manufactured by DuPont and sold under the trade name Nafion®. The other two main components of the MEA—namely, the anode and cathode—are each typically formed from an ionically and electrically conductive binder material mixed with finely divided catalyst particles that are often supported on larger carbon particles. These catalyst particles, which are oftentimes precious metal particles such as those of platinum and ruthenium, catalyze the oxidation and reduction half-reactions that occur at the anode and cathode, respectively.

The operation of many kinds of PEM fuel cells involves supplying hydrogen gas to the fuel cell anode and oxygen gas in the form of either air or pure oxygen to the fuel cell cathode. The anode functions to dissociate the incoming hydrogen gas molecules into protons and electrons. The presence of an electrochemical gradient within the MEA for each of these newly-formed charged particles causes them to move towards the cathode, albeit by different pathways. The protons, as alluded to before, migrate from the anode to the cathode through the solid polymer electrolyte membrane. The electrically insulative nature of the membrane, however, is not amenable to electron transport and thus forces the electrons to flow through an external circuit in order to reach the cathode. It is the purpose of the cathode to then facilitate the reaction of the arriving protons and electrons with supplied oxygen gas to form water. But to keep the MEA operating efficiently in such a manner over an extended period of time is somewhat dependent on the ability to maintain a certain level of hydration in the membrane for optimized proton conductivity while at the same time not flooding the anode and cathode. Indeed, many PEM fuel cell water management controls seek to achieve optimum hydration of the MEA by balancing the generation of water at the cathode, the removal of water from both the anode and cathode, and the relative humidity of the supplied reactant gas streams.

One particular water management issue that can affect the performance of the MEA is hydrogen starvation. Hydrogen starvation generally occurs when the flow of hydrogen gas to the anode is blocked by water accumulation at the anode or at the anode-side flow plate. This accumulation of excess water can be caused by the external humidification of the hydrogen reactant stream and/or by the back diffusion of water from the cathode to the anode. The occurrence of hydrogen starvation is problematic because it can initiate the formation of localized cathode cells near the anode. These localized cells form, in the absence of hydrogen, as a result of oxygen cross-over from the anode to the cathode and the lack of lateral proton transport due to the anisotropic electrical properties of the solid polymer electrolyte membrane. The most available source of protons for these oxygen-rich localized cathode cells now happens to be through the oxidation of carbon materials and/or oxidation of water on catalyst (oxygen evolution reaction) in the cathode. The phenomenon of hydrogen starvation thus promotes performance degradation of the cathode as a result of carbon corrosion.

Possible solutions for mitigating the problem of hydrogen starvation include (i) frequent flushing of the anode compartment to remove any accumulated nitrogen and/or water, (ii) use of an oxygen evolution catalyst that decreases the partial current for carbon oxidation in the cathode, and (iii) use of non-carbon catalyst supports in the cathode. But unfortunately all of these options have significant operational or practical drawbacks. It is therefore desirable to devise an alternative mechanism for addressing the hydrogen starvation problem.

SUMMARY OF THE INVENTION

Each membrane electrode assembly of a PEM fuel cell may comprise a proton exchange membrane with an anode and cathode in intimate contact with opposite sides of the membrane. As mentioned before, the anode may comprise carbon support particles loaded with very small catalyst particles such as those of platinum, palladium, ruthenium, and alloys thereof for facilitating the dissociation of hydrogen gas. The anode may also comprise tungsten-containing hydrogen spillover materials to help mitigate the effects of hydrogen starvation by helping form a hydrogen reservoir near the fuel cell anode. Such a hydrogen reservoir can, during temporary periods of hydrogen starvation, compensate for any localized proton deficits and thus delay the onset of oxygen-driven cathode cells near the anode.

The tungsten-containing hydrogen spillover materials that are provided in the anode to combat the effects of hydrogen starvation may include particles of tungsten oxides and/or tungsten silicides. These tungsten-containing materials have shown the ability to interact with atomic hydrogen and protons in the presence of catalyst-loaded carbon particles to capture hydrogen/protons during periods where hydrogen gas flow to the anode is sufficient. But when hydrogen flow to localized areas of the anode is disrupted, the chemical environment of the starved localized area provokes the release of any stored hydrogen for a period of several seconds to be oxidized and thus sustain normal anode operation. The consumption of such hydrogen reserves postpones the formation of oxygen-driven cathode cells near the anode as well as the detrimental corrosion of cathode carbon materials to feed protons to those cathode cells for at least the time period in which the previously-stored hydrogen is being depleted. This time lag between the commencement of hydrogen starvation and the need for a new source of protons at the anode can provide a much needed timeframe in which the flow of hydrogen can be restored to appropriate levels by either normal fuel cell operating dynamics or affirmative remedial acts.

These tungsten-containing particles, when physically mixed with platinized carbon particles, have been observed in cyclic voltommetry behavior as providing an increase in the hydrogen adsorption/desorption (HAD) area when compared to standard anode constructions that do not include similar tungsten-containing particles. It is believed that such hydrogen storage-promoting functionalities are due to their so-called hydrogen spillover mechanism. This spillover mechanism can best be described as the net effect of platinum-hydrogen, platinum-oxide, and hydrogen-oxide interactions within the tungsten compound's crystal lattice. What this means practically is that hydrogen evolved at low potentials on platinum sites is "spilled over" to nearby tungsten compounds and then entrapped within those compounds' crystal lattice. In preferred embodiments, the tungsten-containing spillover materials may be tungsten trioxide ($WO_3$) particles and/or tungsten disilicide ($WSi_2$) particles. And a preferred mixing ratio of platinized carbon particles to $WO_3$ and $WSi_2$ particles that can achieve enhanced hydrogen storage capabilities in an anode while not otherwise impairing the anode's other functions has been found to be between 3:1 and 1:3, respectively, on a mass ratio basis when the those compounds are utilized individually.

DESCRIPTION OF PREFERRED EMBODIMENTS

Figure 1:
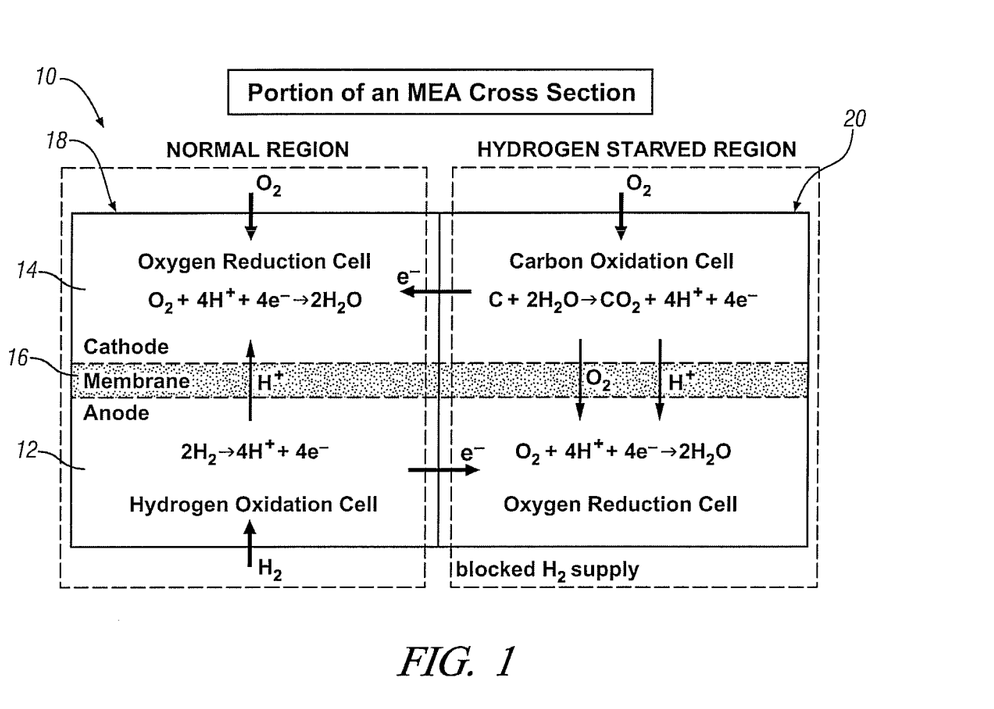
FIG. 1 is a schematic illustration of a cross-section of a portion of a membrane electrode assembly of a PEM fuel cell illustrating a hydrogen starvation effect with chemical equations. Reactions occurring in both a normally functioning region (left side) and a hydrogen starved region (right side) are illustrated.

Referring now to FIG. 1, there is shown a schematic diagram of a partial cross-section of a MEA 10 that illustrates the effects of hydrogen starvation. The MEA, as depicted, includes an anode 12, a cathode 14, and a solid polymer electrolyte 16 membrane sandwiched between and in intimate contact with the anode 12 and cathode 14. The MEA 10 is also partitioned into a normally operating region 18 (left side of the MEA) and a hydrogen starved region 20 (right side of the MEA) to diagrammatically illustrate the effects of hydrogen starvation at the anode 12. In the normal operating region 18 of the MEA 10, supplied molecular hydrogen is oxidized at the anode 12 to generate protons and electrons. The protons then migrate through the membrane 16 towards the cathode 14 while the electrons are released to a current collecting flow plate (not shown) configured to route the electrons through an external load. The electrons are eventually delivered to the cathode 14 where they react with protons and supplied oxygen gas to produce water. But when the flow of supplied hydrogen to a portion of the anode 12 is temporarily interrupted—as in the case of the hydrogen starved region 20 due to a blocked H$_2$ supply—localized oxygen-driven cathode cells may form at the anode 12. These cathode cells are the result of, among others, the back diffusion of oxygen across the membrane 16 from the cathode 14 to the anode 12 and the lateral transport of electrons along the anode 12 from the normal operating region 18 to the hydrogen starved region 20. Lateral electron transfer also occurs in the opposite direction (from the starved region 20 to the normal region 18) at the cathode 14. The temporary unavailability of hydrogen at the anode 12 in the hydrogen starved region 20 means that the only anodic reaction that can provide protons to these local cathode cells is the anodic oxidation of carbon support materials in the cathode 14. (An oxygen evolution reaction also can occur beside carbon corrosion, especially if the potential is greater than 1.6V/RHE) The unwanted oxygen-driven cathode cells that form near the anode 12 as a result of hydrogen starvation can thus contribute to performance degradation of the MEA 10, and ultimately a PEM fuel cell, through the corrosion of carbon-based catalyst support materials found in the cathode 14.

To address the problem of hydrogen starvation, the use of tungsten-containing hydrogen spillover materials may be provided in an anode of a PEM fuel cell's MEA. These tungsten-containing spillover materials can facilitate the formation of hydrogen reservoirs near the anode that are capable of storing useful amounts of hydrogen gas and/or protons during periods when hydrogen supply to the anode is operationally sufficient. The hydrogen/proton reserves stored in such hydrogen reservoirs may then be released in response to a changing localized electrochemical environment that accompanies periods of insufficient hydrogen supply to the anode. This infusion of hydrogen/protons can help compensate for temporary proton deficiencies in the MEA and thus ultimately delay the corrosion of carbon support materials in the cathode. For instance, and referring momentarily back to FIG. 1, the release of stored hydrogen in the hydrogen starved region 20 of the anode 12 can mitigate against carbon cathode corrosion by (1) helping to reduce the amount of oxygen gas diffusing to the anode 12 and thus disrupting the formation of oxygen-driven cathode cells, (2) decreasing the lateral movement of electrons to hydrogen starved regions of the anode 12 by minimizing the potential between the hydrogen starved region 20 and the normal operating region 18 of the anode 12, and (3) providing a reaction mechanism for supplying protons for the reduction of cross-over oxygen at the anode 12 that is energetically favored over the corrosion of carbon cathode materials.

Suitable tungsten-containing hydrogen spillover materials that may be provided in the anode of an MEA are particles of tungsten oxides and/or particles tungsten silicides. Tungsten is an element that displays a range of valences and may form several different oxides and silicides. Tungsten trioxide, WO$_3$, and tungsten disilicide, WSi$_2$, are examples of such suitable tungsten oxygen-containing and silicon-containing compounds. These kinds of particles, when physically mixed with catalyst loaded carbon particles such as platinized carbon to form a composite anode, have shown an ability to promote the formation of hydrogen reservoirs through their spillover mechanism when compared to other anode constructions that do not contain such spillover materials. This has been observed in the cyclic voltammetry behavior as an increase in the hydrogen absorption/desorption area (HAD) of the composite anode material structure. And such increases in the anode's HAD are directly proportional to the transition time it takes for a hydrogen starved anode under a constant current density to reach potentials positive to 0.5 V/rhe—an indication that hydrogen is not being oxidized. The observed hydrogen spillover effects of tungsten oxides and silicides when mixed with platinized carbon is likely attributable to the net effect of platinum-hydrogen, platinum-oxide, and hydrogen-oxide interactions as well as strong platinum-support interactions. It is believed that the spillover of hydrogen starts with the surface diffusion from platinum sites followed by the chemical interaction of hydrogen within the tungsten-oxide crystal lattice. Proton intercalation into the tungsten-oxide lattice can also occur as a result of tungsten redox state variations.

In exemplary embodiments, the tungsten-containing spillover materials that may be used to form composite anodes are particles of tungsten trioxide (WO$_3$) and/or tungsten disilicide (WSi$_2$). Both of these compounds have shown the ability to improve the composite anode's HAD. They have also demonstrated an ability to significantly delay a voltage excursion of the composite anode to potentials of 0.5 V/rhe and greater (sometimes referred to as the oxygen evolution region) upon cessation of adequate supplied hydrogen flow. These tungsten-containing spillover materials were tested in combination with a representative anode catalyst material, platinum particles supported on electronic conductive carbon particles.

To demonstrate these beneficial effects, two experimental procedures were performed on composite anodes structures that contained particles of either $WO_3$ or $WSi_2$. The performance results and general observations gleaned from these procedures were ultimately compared against a benchmark anode structure for context. The first procedure conducted involved talking galvanostatic measurements of gas-diffusion electrodes while switching the gas flow from hydrogen to argon to simulate a hydrogen starvation effect. The second procedure conducted involved subjecting a flooded gas-diffusion electrode to potential cycling under simulated fuel cell conditions to investigate the electrodes hydrogen storage capacity, durability, and optimal electrode composition.

Galvanostatic Measurements

Galvanostatic experiments were performed with Teflon-bonded gas-diffusion electrodes having a 2.8 cm² geometric area. The electrodes were placed in 0.1 M perchloric acid and subjected to a constant anodic current density of 20 mA/cm² at room temperature (25° C.) and atmospheric pressure. Galvanostatic measurements of potential versus time for the electrodes were obtained with a Radiometer Analytical VoltaLab potentiostat. To simulate hydrogen starvation, the flow fields of each of the electrodes was initially supplied with a source of hydrogen gas that was later abruptly switched over to a source of argon gas.

Three electrode compositions were used in this galvanostatic analysis. The benchmark electrode was composed of 47.7 weight % platinum on Vulcan carbon commercial catalyst mixed with Vulcan XC-72 carbon in a 1:1 mass ratio. The $WO_3$ electrode was composed of 47.7 wt. % platinum on Vulcan carbon commercial catalyst mixed with tungsten trioxide (Aldrich Cat #550086, BET area 17 m²/g) in a mass ratio of 1:1. And lastly, the $WSi_2$ electrode was composed of 47.7 wt. % platinum on Vulcan carbon commercial catalyst mixed with tungsten disilicide (Noah Technologies #14963, 99.5%, −325 mesh, BET area of 0.5 m²/g) in a 1:1 mass ratio. Additionally, each of these three electrodes contained 30 wt. % polytetrafluoroethylene (PTFE), which resulted in a 0.37 (±0.01) mg/cm² platinum loading for the electrodes. The three electrodes were also sintered for 45 minutes at 260° C. in an argon atmosphere.

Figure 2:
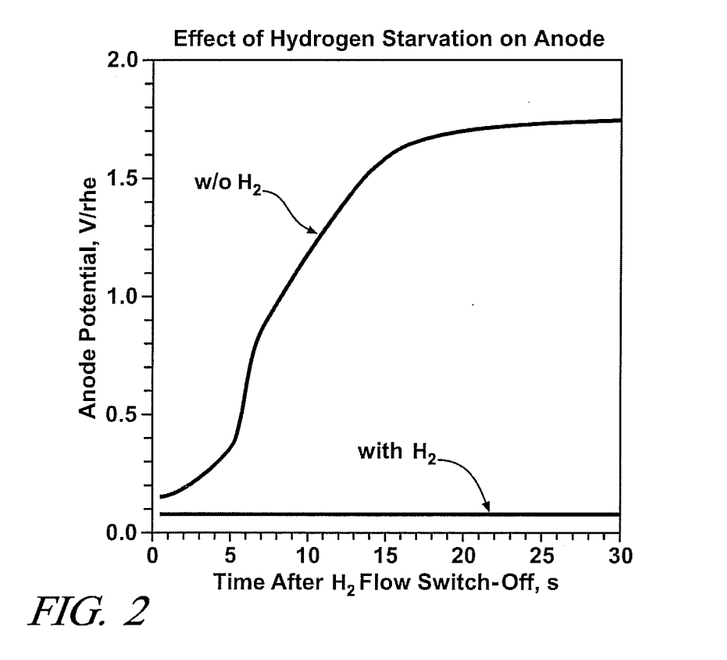
FIG. 2 is a graph illustrating the galvanostatic response of a gas diffusion electrode made of commercial platinum on Vulcan carbon catalyst and XC-72 carbon in a 1:1 mass ratio in the presence and absence of a hydrogen supply. The anode potential (in V/rhe, reversible hydrogen electrode) is plotted against time after hydrogen flow shut off (in seconds). The origin of the time axis corresponds to the instant when the gas flow was switched from hydrogen to argon.

FIG. 2 shows the effect of hydrogen starvation on the benchmark electrode. In one instance, the benchmark electrode was adequately supplied with hydrogen gas to simulate normal anode operation. During this period of sufficient hydrogen flow the electrode potential exhibited a constant value of about 0.1 V/rhe (reversible hydrogen electrode) or less over time due to the continuous oxidation of hydrogen. In another instance, however, hydrogen flow to the anode was abruptly switched to argon flow. The origin of the time axis in FIG. 2 represents the instant when that switch occurred. And as can be seen, when the hydrogen flow was switched to argon flow, the electrode potential gradually increased over time to 1 V/rhe and beyond as any residual and adsorbed hydrogen remaining in the anode were consumed. The rate of this potential increase depends largely on the pseudo-capacitance of the electrode material. But in any event, the potential excursion observed can lead to severe carbon corrosion, especially since the anode potential can reach values as high as 1.6 V/rhe fairly rapidly.

Figure 3:
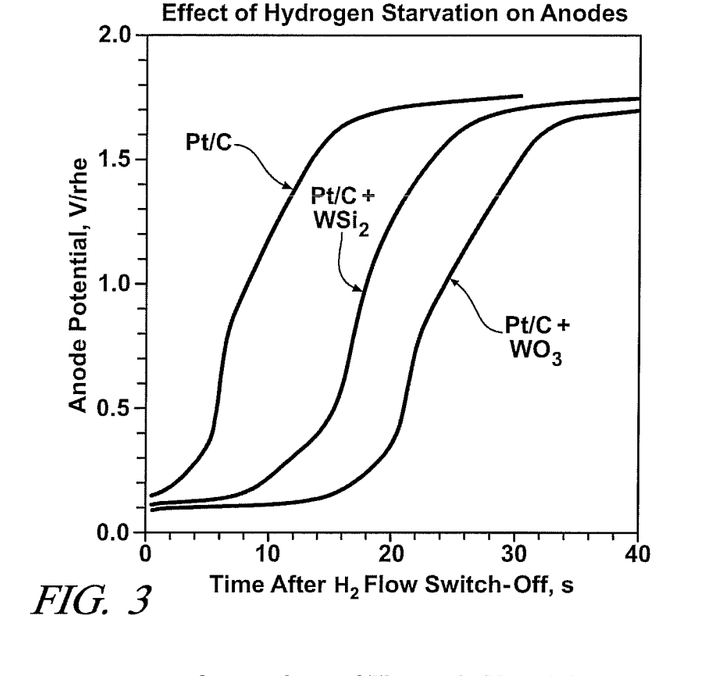
FIG. 3 is a graph providing a comparison of the effects of hydrogen starvation on gas diffusion electrodes made of a benchmark Pt/C material, a Pt/C+$WO_3$ composite material mixed in a 1:1 mass ratio, and a Pt/C+$WSi_2$ composite material mixed in a 1:1 mass ratio. The origin of the time axis corresponds to the instant when the gas flow was switched from hydrogen to argon.

FIG. 3 shows a graphical comparison of the effects of hydrogen starvation on the benchmark electrode, the $WO_3$ electrode, and the $WSi_2$ electrode. Again, the origin of the time axis in this Figure represents the instant when the hydrogen gas flow was switched to argon gas flow. The anode potential response for each of the three electrodes after the disruption in hydrogen gas flow can be broken down into three regions: (1) a relatively slow increase to 0.5 V/rhe followed by (2) a fast rise to 1.6 V/rhe and ending with (3) a leveling off towards 1.7-1.8 V/rhe. The potential responses of the $WO_3$ and $WSi_2$ composite electrodes during periods of deficient hydrogen supply are significantly more favorable than that observed for the benchmark electrode. For example, the $WSi_2$ electrode was able to hold off a potential excursion to 0.5 V/rhe for about 15 seconds following the disruption of hydrogen gas flow. The $WO_3$ electrode was similarly able to delay a potential excursion to 0.5 V/rhe for about 21 seconds after hydrogen gas flow was shut off. A summary of the electrode potential rise times is shown below in Table 1. It should be noted that the potential of the benchmark electrode reaches 1.6 V/rhe over a time span where both the $WO_3$ electrode and $WSi_2$ electrode are still below 0.5 V/rhe.

TABLE 1

| | Potential Rise Time from <0.1 V/rhe, seconds | | |
|---|---|---|---|
| Material | to 0.5 V/rhe | to 1.0 V/rhe | to 1.6 V/rhe |
| Pt/C | 5.7 | 8.4 | 15.3 |
| Pt/C + $WSi_2$ | 15 | 18 | 25 |
| Pt/Cu + $WO_3$ | 21 | 24 | 32 |

Figure 4:
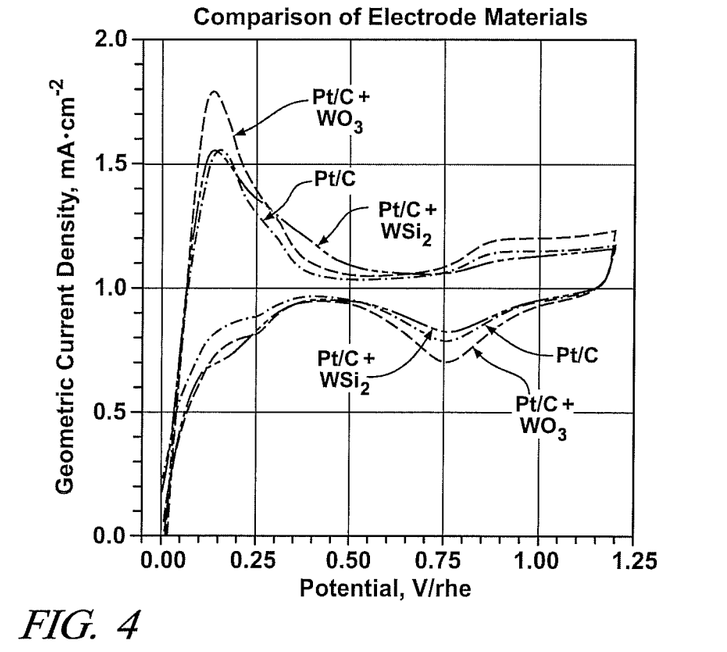
FIG. 4 shows the voltage response of gas diffusion electrodes made of a benchmark Pt/C material, a Pt/C+$WO_3$ composite material mixed in a 1:1 mass ratio, and a Pt/C+$WSi_2$ composite material mixed in a 1:1 mass ratio during potentiodynamic cycling at 20 mV/s.

In order to interpret the transition time data in Table 1 and to investigate correlations with the hydrogen desorption charge, voltammograms (current-voltage curves) at 20 mV/s scan rates in argon saturated 0.5 M perchloric acid solutions were performed for the various electrodes and plotted in FIG. 4. Although the electrodes had a high ohmic drop, they were still suitable for determining the hydrogen desorption charge ($H_{DES}$) for each electrode. These hydrogen desorption charges were calculated from the total desorption charge by subtracting the double layer charge and the charge from the oxidation of hydrogen that evolved during the cathodic part of the cycles. This hydrogen evolution charge was calculated by integrating the CV response in the cathodic hydrogen evolution region. The calculated hydrogen desorption charges ($H_{DES}$) are shown below in Table 2.

TABLE 2

| Sample | $Q_{tot\,ANODIC}$, mC | $Q_{res\,DL}$, mC | $Q_{H2\,gas}$, mC | $Q(H_{DES})$, mC | $A(H_{DES})$, cm²$_{Pt}$ | $m_{Pt}$, mg | $A(H_{DES})/m$ m²/g$_{Pt}$ |
|---|---|---|---|---|---|---|---|
| TKK Pt/C (Vulcan) | 281 | 43.0 | 93 | 145 | 690 | 1.07 | 65 |
| Pt/C + $WSi_2$ | 371 | 80.6 | 110 | 181 | 860 | 1.04 | 83 |
| Pt/C + $WO_3$ | 411 | 61.8 | 118 | 231 | 1102 | 1.01 | 109 |

Figure 5:
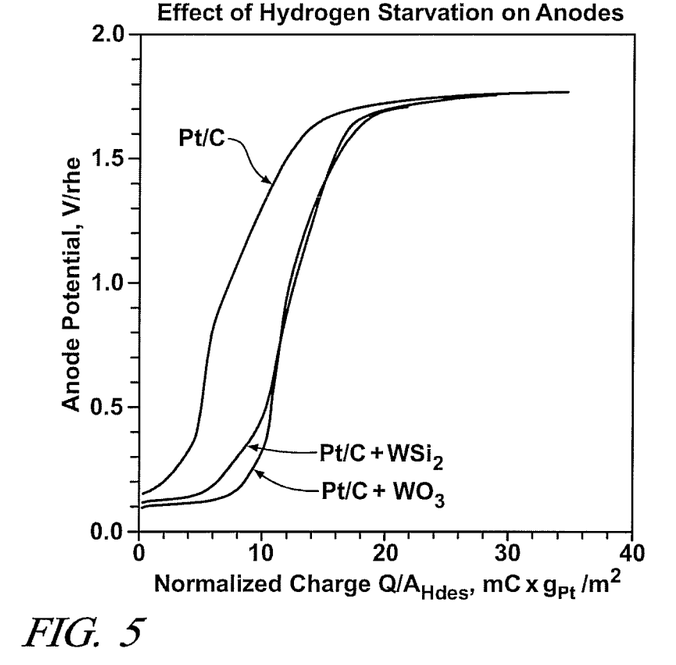
FIG. 5 is a graph of the potential responses observed in gas diffusion electrodes made of a benchmark Pt/C material, a Pt/C+$WO_3$ composite material mixed in a 1:1 mass ratio, and a Pt/C+$WSi_2$ composite material mixed in a 1:1 mass ratio as a function of charge normalized to the measured hydrogen desorption area.
Figure 6:
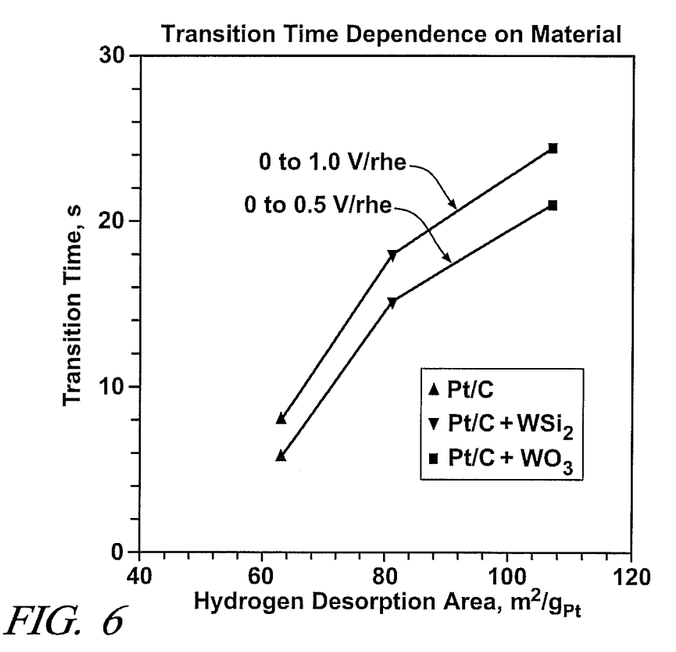
FIG. 6 is a graph of transition times for voltage shifts from 0V/rhe to 0.5V/rhe and from 0V/rhe to 1.0V/rhe after switching a hydrogen supply flow to an argon flow for gas diffusion electrodes made from a benchmark Pt/C material, a Pt/C+$WO_3$ composite material mixed in a 1:1 mass ratio, and a Pt/C+$WSi_2$ composite material mixed in a 1:1 mass ratio.

The data contained in FIGS. 3 and 4 and Tables 1 and 2 were then used to generate the curves of FIG. 5. Those curves represent each of the electrodes potential response during the galvanostatic experiments as a function of the charge passed normalized by the hydrogen desorption area [A($H_{DES}$)] of the corresponding composite electrode materials. FIG. 6 thus shows that there exists a considerable lag in the increase of the electrical potential under hydrogen starved conditions for both the $WO_3$ electrode and the $WSi_2$ electrode. It can also be seen that the response normalized by the HAD area for those two electrodes is virtually identical above 0.5 V/rhe. This indicates that hydrogen spillover from platinum to the tungsten compounds occurs not only for electrochemically-produced adsorbed hydrogen but also for molecular hydrogen in the gas phase. In other words, hydrogen evolved at low potentials on platinum sites may spill over to the tungsten compounds and then be stored inside its crystal lattice.

FIG. 6 summarizes, for each electrode, the transition times for voltage shits from 0 V/rhe to about 0.5 V/rhe and from 0 V/rhe to about 1.0 V/rhe after switching from hydrogen gas flow to argon gas flow. This Figure shows that the tungsten-containing electrodes exhibit longer transition times most likely because of their higher hydrogen storage capacities at potentials below about 0.5 V/rhe (See [A($H_{DES}$)] values in Table 2). FIG. 6 thus suggests that a positive correlation exits between the transition time and the hydrogen desorption area.

Potential Cycling

Potential cycling was carried out in three-electrode cell systems at a scan rate of 10 mV/s over the potential range of 0<E<1.2 V/rhe in a 0.5 M $H_2SO_4$ aqueous solution at 80° C. with an argon gas purge. The three electrodes for each cell system were a working electrode, a counter electrode, and a reference electrode. The working electrodes of each cell system were formed as circular coupons (about 9 mm in diameter) and pressed onto a gold current collector under one metric ton pressure. The coupons were cut from sheets prepared by a roll and paste technique—to deposit working electrode material—with a 10% Teflon binder. The gold current collectors were made of a 1 mm diameter gold wire that was welded to the rim of a gold disc that measured 12 mm in diameter. The counter electrodes of each cell system were composed of ultra-high purity (99.999%) carbon rods coated with a mixture of graphitized carbon and Nafion®. The reference electrodes of each cell system were composed of reversible hydrogen electrodes. Those hydrogen electrodes comprised a captive hydrogen gas bubble at room temperature sealed inside a glass tube and in contact with a platinum wire.

Seven different three-electrode cell systems were subjected to the potential cycling procedure just mentioned. The working electrodes of each cell system, however, were compositionally different. In the benchmark cell system, the working electrode was composed of 46.7 wt. % platinum on Vulcan XC-72 carbon commercial catalyst. The other six cell systems utilized composite working electrodes—three with $WO_3$ and three with $WSi_2$. The three $WO_3$ cell systems included working electrodes comprised of 46.7 wt. % platinum on Vulcan XC-72 carbon commercial catalyst and mixed with $WO_3$ nanopowder (Aldrich Cat #550086). The mass ratios of Pt/C to $WO_3$ for the three working electrodes in the three $WO_3$ cell systems were 1:3, 1:1, and 3:1. The three $WSi_2$ cell systems included working electrodes comprised of 46.7 wt. % platinum on Vulcan XC-72 carbon commercial catalyst and mixed with $WSi_2$ (Noah Technologies #14963). The mass ratios of Pt/C to $WSi_2$ for the three working electrodes in the three $WSi_2$ cell systems were also 1:3, 1:1, and 3:1.

For each of the seven cell-systems, two voltammograms each were recorded at 2 mV/s during potentiodynamic cycling at 10 mV/s and starting one cycle prior to, and including, cycles 10, 20, 50, 100, 200, 500, 1000, 2000, 3000, and 4000, in order to determine the hydrogen adsorption/desorption area (HAD) for their working electrodes. The HAD areas were calculated using an Arbin BT-2000 multi-channel instrument. X-ray diffraction measurements were also taken for each working electrode at 0 and 1000 cycles using Cu $k_\alpha$ radiation on a Bruker General Area Detector Diffraction System (GADDS). Platinum crystallite sizes were calculated from the full width half maximum (FWHM) of the Pt (220) reflection using the Scherrer equation. The FWHM was measured using peak profile fitting software.

Figure 7:
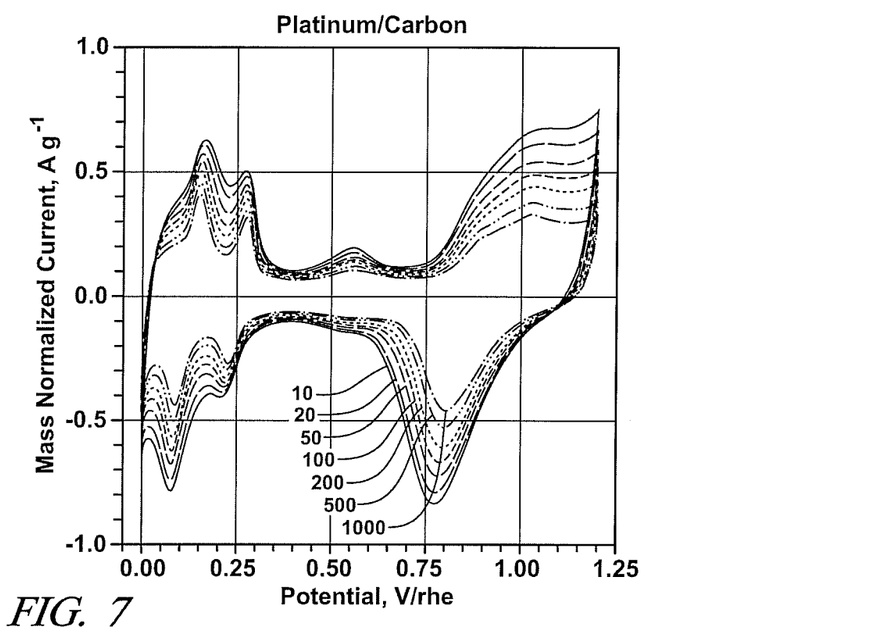
FIG. 7 is a cyclic voltammogram showing the voltammetry response of a working electrode made of a benchmark Pt/C material. Current normalization was performed with respect to the initial active material mass (Pt+C) of the electrode, i.e., after subtraction of the Teflon binder mass.

FIG. 7 shows the cyclic voltammogram of the working electrode in the benchmark cell system. A normalized current in which the effects of the Teflon binder were subtracted was plotted against potential. The voltammogram exhibits two peaks for both the cathodic adsorption (positive current peaks) and the anodic desorption of hydrogen from platinum (negative current peaks). Both of the cathodic and anodic peaks were similarly affected by the loss of HAD area due to potential cycling. But in each of the cell systems that contained tungsten-containing compounds in their working electrodes, the interaction of the hydrogen storing oxide material (i.e., that attributable to the tungsten) changed the structure of the cyclic voltammogram observed for the benchmark cell system. Such changes can be seen in FIGS. 8-13, which also plot a normalized current for their respective working electrode against potential.

Figure 8:
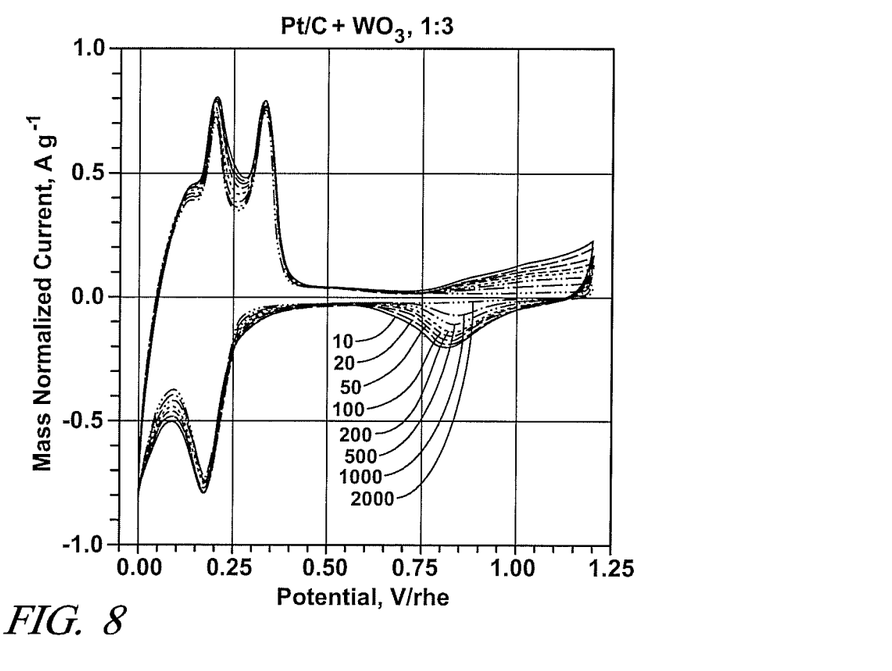
FIG. 8 is a cyclic voltammogram showing the voltammetry response of a working electrode made of a Pt/C+$WO_3$ composite material mixed in a 1:3 mass ratio. Current normalization was performed with respect to the initial active material mass (Pt+C+$WO_3$) of the electrode, i.e., after subtraction of the Teflon binder mass.

FIG. 8 shows the cyclic voltammogram of the working electrode in the $WO_3$ cell system in which the mass ratio of Pt/C to $WO_3$ was 1:3. As shown, potentiodynamic cycling leads to decrease in the PtOH formation and its eventual disappearance by cycle 3000. This indicates a strengthening of the Pt interaction with $WO_3$ and a concomitant weakening of the Pt—H and Pt—$H_2O$ interactions. Moreover, the working electrode has two anodic peaks at 0.2 V and 0.32 V but only one cathodic peak centered at 0.17 V. The two anodic peaks are affected differently by the potential cycling. The anodic peak at 0.2 V, which may be ascribed to weakly bonded hydrogen, decreases in height. But the anodic peak at 0.32 V, which may be attributed to strongly bonded hydrogen, is relatively unaffected by potential cycling.

Figure 9:
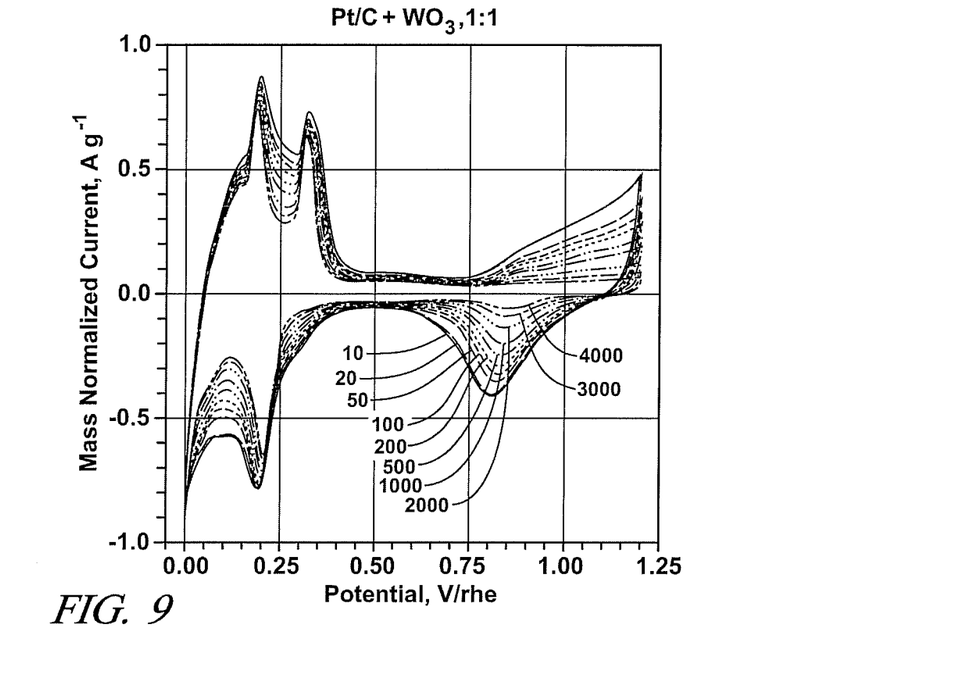
FIG. 9 is a cyclic voltammogram showing the voltammetry response of a working electrode made of a Pt/C+$WO_3$ composite material mixed in a 1:1 mass ratio. Current normalization was performed with respect to the initial active material mass (Pt+C+$WO_3$) of the electrode, i.e., after subtraction of the Teflon binder mass.
Figure 10:
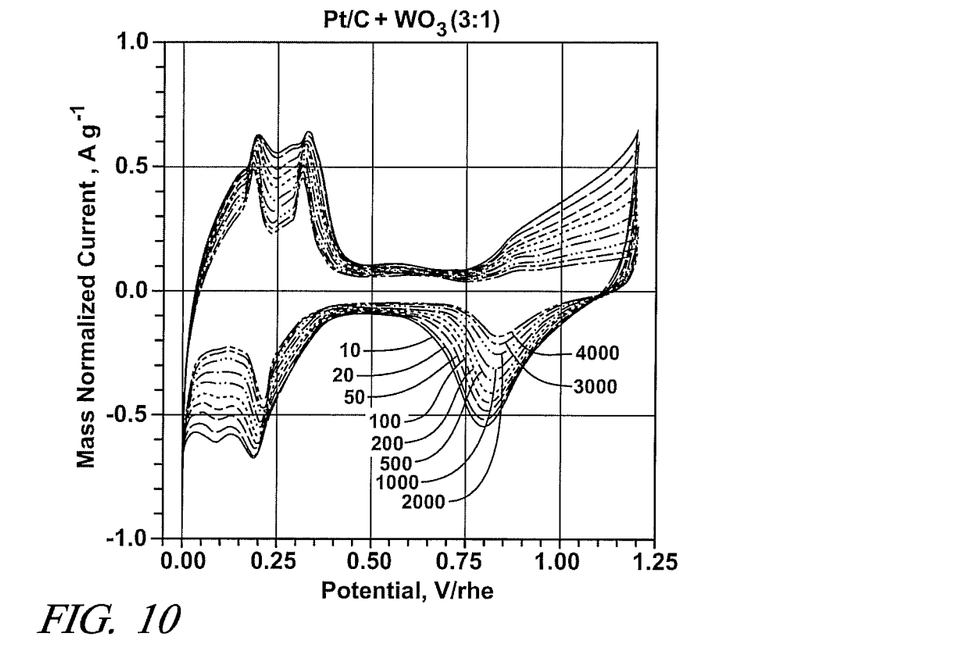
FIG. 10 is a cyclic voltammogram showing the voltammetry response of a working electrode made of a Pt/C+$WO_3$ composite material mixed in a 3:1 mass ratio. Current normalization was performed with respect to the initial active material mass (Pt+C+$WO_3$) of the electrode, i.e., after subtraction of the Teflon binder mass.

FIGS. 9 and 10 show the cyclic voltammograms of the working electrodes that had mass ratios of Pt/C to $WO_3$ of 1:1 and 3:1, respectively. In each instance the decrease in PtOH charge with cycling is not as pronounced as that displayed in the voltammogram of FIG. 8 (1:3 mass ratio) as an appreciable amount of PtOH is still forming after 4000 cycles. This evidences a lesser exposure of platinum to $WO_3$. Each of the hydrogen desorption curves in FIGS. 8-10 also demonstrate that shrinking mass fraction of Pt/C to $WO_3$ results in a somewhat different transition with increasing cycle numbers; that is, the curves display a broad desorption peak at 0.2 V and 0.32 V in FIG. 10 as opposed to the sharp peaks observed in FIG. 8. This is likely due to restructuring of the platinum sites in response to potentiodynamic cycling that results in a decreased heterogeneity in the energy of hydrogen adsorption sites. A restructuring of this kind may be responsible for explaining the change from a continuum of binding strengths (FIG. 10) to two better defined binding strengths (FIG. 8).

Figure 11:
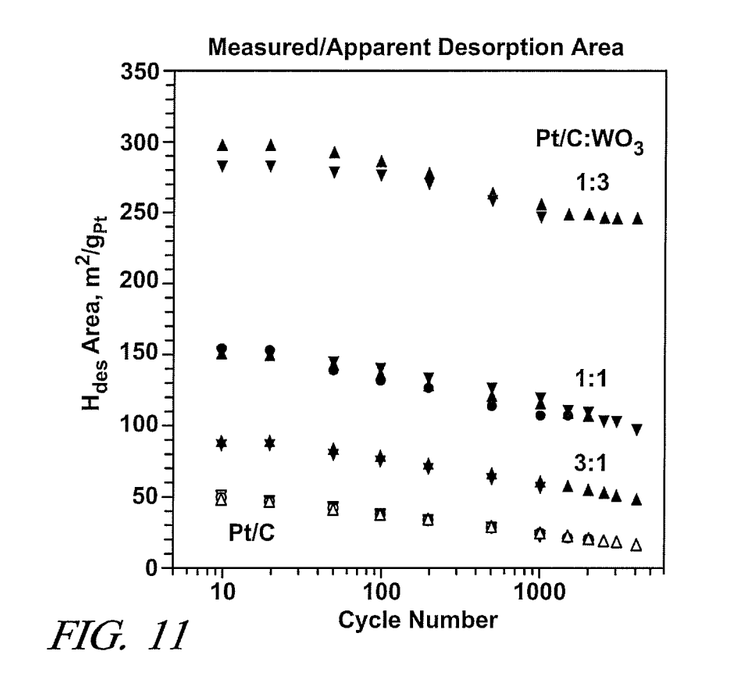
FIG. 11 is a graph of the hydrogen desorption areas, calculated from cyclic voltammetry, as a function of cycle number for three working electrodes made of Pt/C+$WO_3$ composite material in which the mass ratio of Pt/C to $WO_3$ in the working electrodes was 1:3, 1:1, and 3:1.

FIG. 11 displays the hydrogen desorption areas as a function of cycle number for the three $WO_3$ working electrodes with 3:1, 1:1, and 1:3 mass ratios of Pt/C to $WO_3$ and for the benchmark working electrode. The observed initial desorption areas were 300 $m^2/g_{PT}$, 150 $m^2/g_{PT}$, and 90 $m^2/g_{PT}$ for the 1:3, 1:1, and 3:1 compositions, respectively. The benchmark working electrode had a corresponding initial desorption area of 58 $m^2/g_{PT}$. After 1000 cycles, the observed desorption areas for the 1:3, 1:1, and 3:1 $WO_3$ working electrodes were 250 $m^2/g_{PT}$, 120 $m^2/g_{PT}$, and 60 $m^2/g_{PT}$, respectively, while the hydrogen desorption area for benchmark working electrode was found to be 20 $m^2/g_{PT}$. This data thus reveals that the amount of hydrogen spillover increases with an increase in the mass ratio of $WO_3$ to Pt/C in the composite working electrode. Indeed, for the 3:1 mass ratio of $WO_3$ to Pt/C, the desorption charge reached as high as about six times that of the benchmark working electrode (300 $m^2/g_{PT}$ to 58 $m^2/g_{PT}$). Furthermore, as the electrodes were cycled, the benchmark working electrode lost HAD area at a faster rate than the $WO_3$ working electrodes. This is evident from the fact that, after 1000 cycles, the HAD area of 3:1 $WO_3$ working electrode had was greater than ten times that of the benchmark electrode (250 $m^2/g_{PT}$ to 20 $m^2/g_{PT}$).

Figure 12:
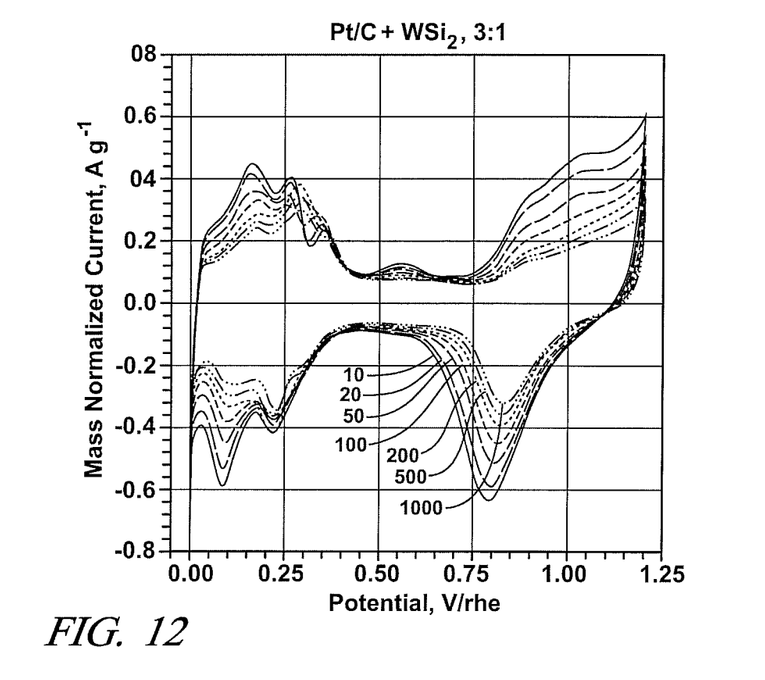
FIG. 12 is a cyclic voltammogram showing the voltammetry response of a working electrode made of a Pt/C+$WSi_2$ composite material mixed in a 3:1 mass ratio. Current normalization was performed with respect to the initial active material mass (Pt+C+$WSi_2$) of the electrode, i.e., after subtraction of the Teflon binder mass.
Figure 13:
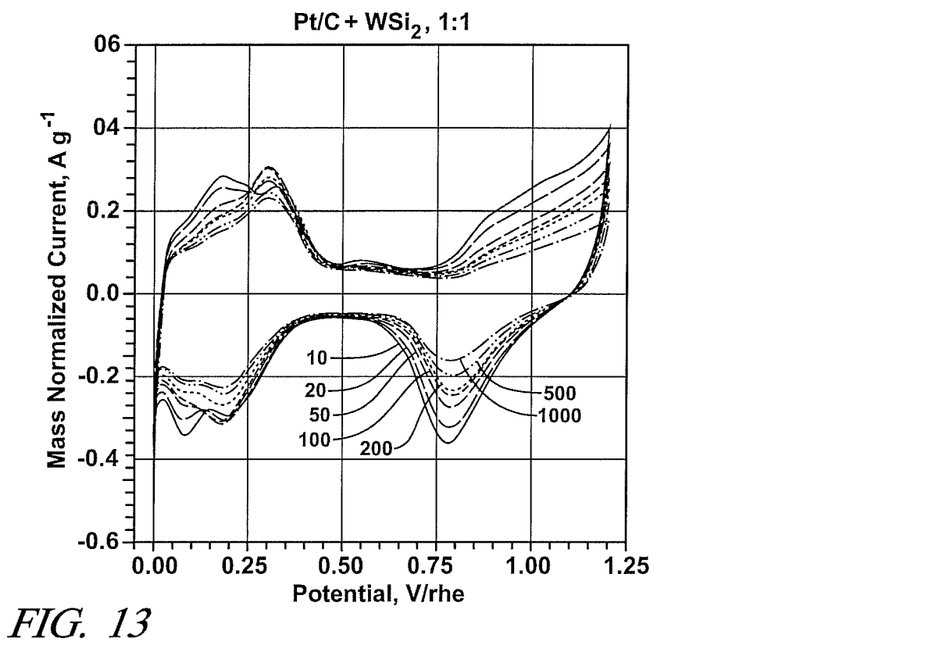
FIG. 13 is a cyclic voltammogram showing the voltammetry response of a working electrode made of a Pt/C+$WSi_2$ composite material mixed in a 1:1 mass ratio. Current normalization was performed with respect to the initial active material mass (Pt+C+$WSi_2$) of the electrode, i.e., after subtraction of the Teflon binder mass.
Figure 14:
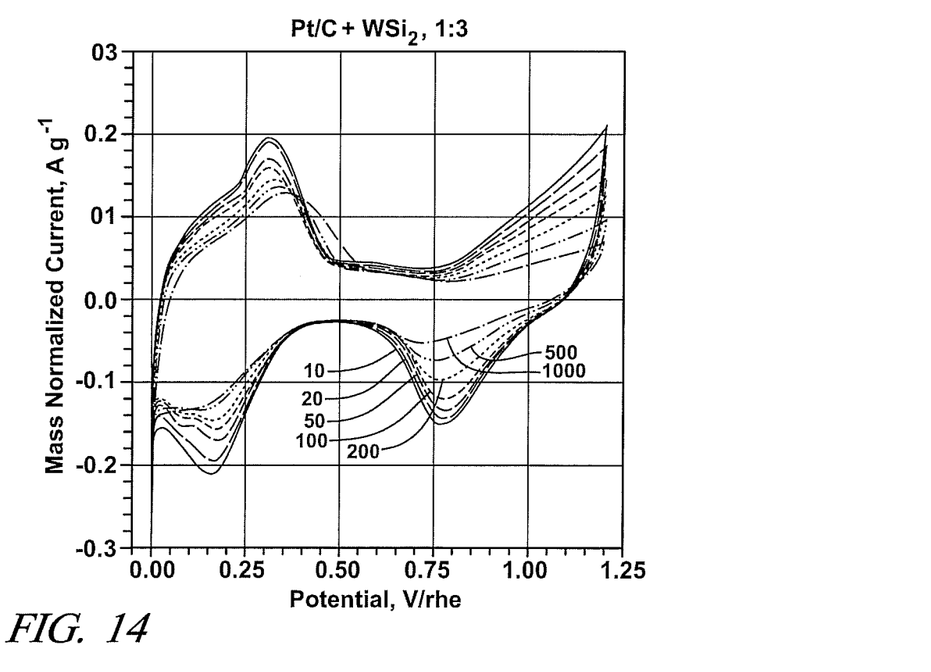
FIG. 14 is a cyclic voltammogram showing the voltammetry response of a working electrode made of a Pt/C+$WSi_2$ composite material mixed in a 1:3 mass ratio. Current normalization was performed with respect to the initial active material mass (Pt+C+$WSi_2$) of the electrode, i.e., after subtraction of the Teflon binder mass.

FIGS. 12, 13, and 14 show the cyclic voltammograms—which, as before, plot a normalized current for their respective working electrode against potential—of the working electrodes in the $WSi_2$ cell systems. FIG. 12 depicts the working electrode that has a Pt/C to $WSi_2$ mass ratio of 3:1, FIG. 13 depicts the working electrode that has a Pt/C to $WSi_2$ mass ratio of 1:1, and FIG. 14 depicts the working electrode that has a Pt/C to $WSi_2$ mass ratio of 1:3. And much like the $WO_3$ working electrodes, changes in the ratios of peak heights with cycling suggest a restructuring of platinum sites. Those changes are, however, more extensive in the $WSi_2$ working electrode voltammograms than the $WO_3$ working electrode voltammograms. It was also observed that the decrease in the amount of PtOH formed as cycling increase is more pronounced with increasing amounts of $WSi_2$ than with increasing amounts of $WO_3$. Moreover, the increase in $WSi_2$ material seems to be accompanied by a significant increase in the IR drop. This is apparent both from a decreasing V-I slope near 0 V/rhe when switching the potential scan direction from cathodic to anodic, and from the shifts in potential of the PtOH reduction peak as the $WSi_2$ contents in the working electrode increase. The increase in the IR drop is likely due to tungsten oxide formation; an interpretation which is corroborated by the X-ray diffraction data provided below.

Figure 15:
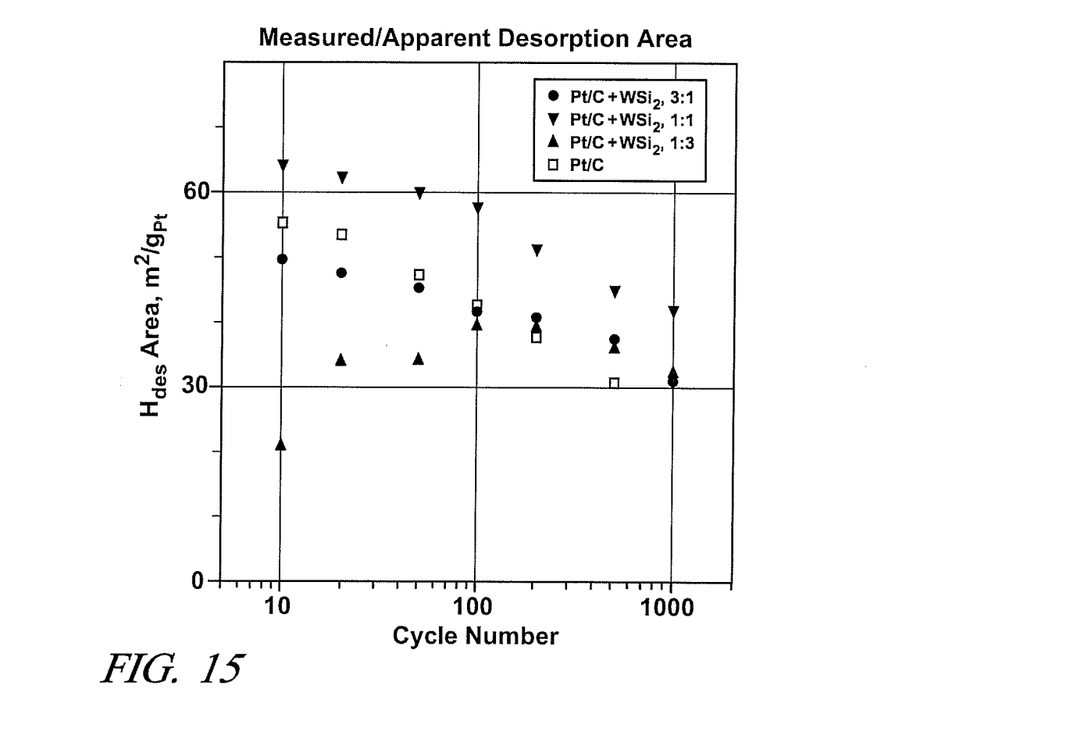
FIG. 15 is a graph of the hydrogen desorption areas, calculated from cyclic voltammetry, as a function of cycle number for three working electrodes made of Pt/C+WSi$_2$ composite material electrodes in which the mass ratio of Pt/C to WSi$_2$ in the composite electrodes was 1:3, 1:1, and 3:1.

FIG. 15 displays the hydrogen desorption areas as a function of cycle number for the three $WSi_2$ working electrodes with 3:1, 1:1, and 1:3 mass ratios of Pt/C to $WSi_2$ and for the benchmark electrode. The trends for the $WSi_2$ electrodes are slightly different from those of the $WO_3$ electrodes. For example, only the 1:1 mass ratio $WSi_2$ working electrode exhibited a HAD area that exceeded the HAD area of the benchmark electrode by approximately 10 $m^2/g_{PT}$ at each cycle. The 3:1 mass ratio $WSi_2$ working electrode, on the other hand, closely resembled the benchmark working electrode for about 100 cycles and then slowly diverged upward (greater HAD area) as cycling continued. And finally, the 1:3 mass ratio $WSi_2$ working electrode initially exhibited a lower HAD area than the benchmark working electrode. It's HAD area then surpassed the benchmark electrode around 100 cycles and began functioning very similar to the 1:1 $WSi_2$ working electrode as cycling continued. The data from FIG. 15 suggests that the $WSi_2$ material must be oxidized first before significant hydrogen spillover can occur.

Figure 16:
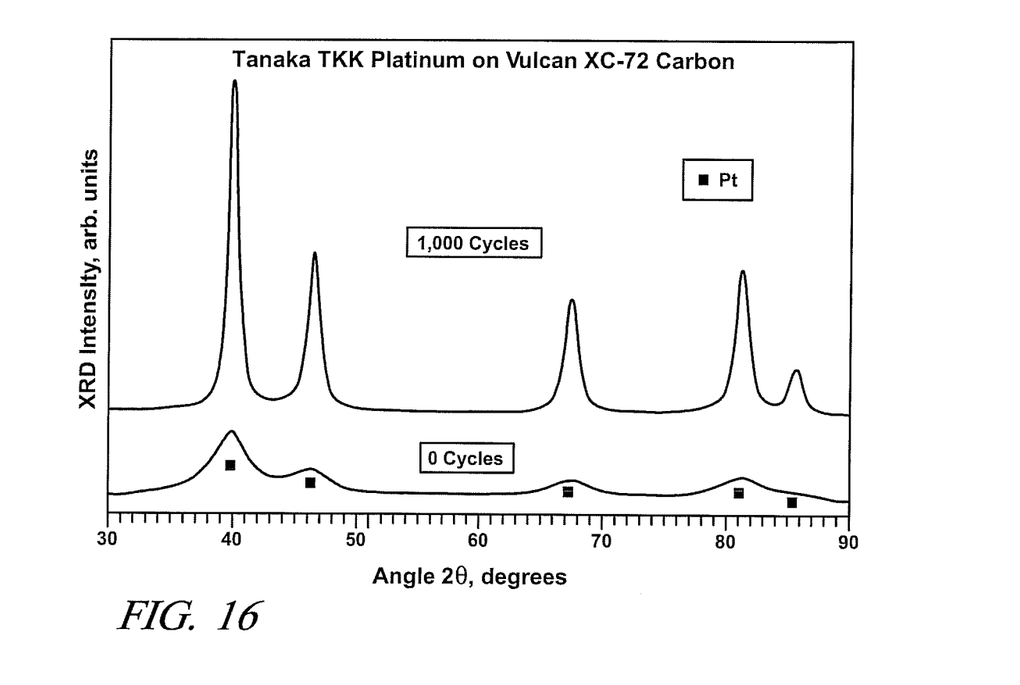
FIG. 16 is an XRD pattern for a working electrode made of a benchmark Pt/C material in its as-prepared state and after 1000 cycles.

X-ray diffraction (XRD) data was collected for the working electrodes in their as-prepared state and after 1000 cycles for some of the seven potential cycling experiments—namely, the benchmark working electrode, the 1:3 mass ratio $WO_3$ working electrode, and all three of the $WSi_2$ working electrodes. FIG. 16 shows the XRD data for the benchmark working electrode. The only crystalline phase observed in that electrode is that of platinum metal. As depicted, the platinum diffraction peaks are broad before cycling. But as cycling continues they experience both an increased intensity and a considerable narrowing. The increase in intensity with cycling suggests that a significant fraction of the platinum does not contribute to the diffraction pattern in the non-cycled electrode because of reduced crystallinity of the platinum particles. The average Pt crystallite size before and after cycling was estimated at 2.4 nm and 9.3 nm, respectively, using the Scherrer equation. Increase in particle size may be a result of two processes. The first is associated with platinum dissolution and re-deposition, and the second process is due to corrosion of carbon support.

Figure 17:
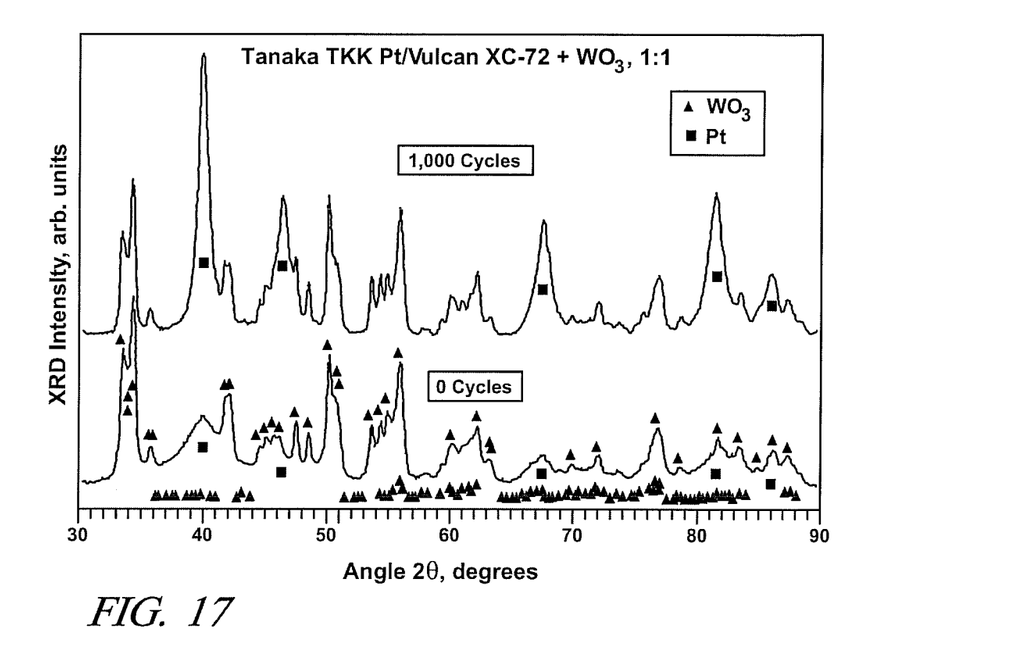
FIG. 17 is an XRD pattern for a working electrode made of a Pt/C+WO$_3$ composite material in its as-prepared state and after 1000 cycles. The mass ratio of Pt/C to WO$_3$ of this working composite electrode was 1:1.

FIG. 17 shows the XRD data for the 1:1 mass ratio $WO_3$ working electrode. This data corresponds with reference data for Pt metal and $WO_3$. Regarding $WO_3$, only small differences were observed between the diffraction peaks of the as-prepared and cycled electrode materials. The diffraction peaks for platinum, however, were significantly stronger and sharper after extensive cycling. The average Pt crystallite size after 1000 cycles was estimated at 7.7 $m^{-1}$ using the Scherrer equation.

Figure 18:
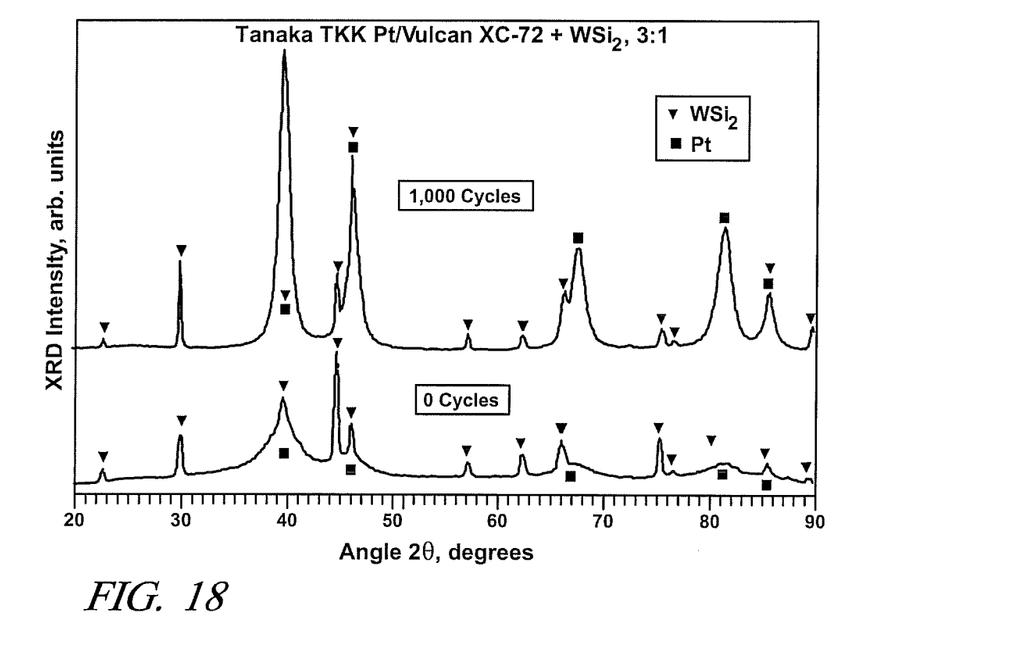
FIG. 18 is an XRD pattern for a working electrode made of a Pt/C+WSi$_2$ composite material in its as-prepared state and after 1000 cycles. The mass ratio of Pt/C to WSi$_2$ of this working composite electrode was 3:1.
Figure 19:
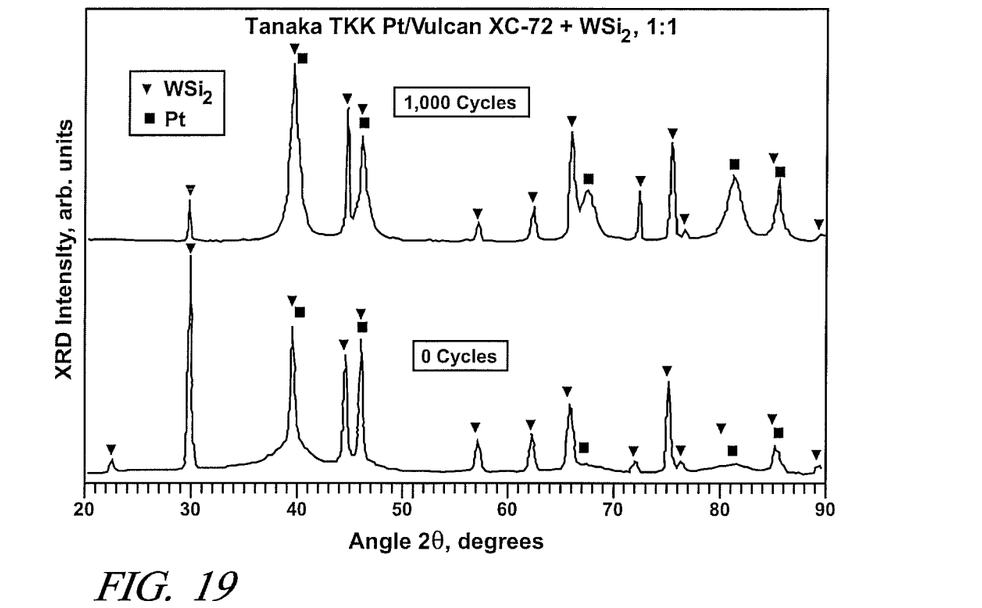
FIG. 19 is an XRD pattern for a working electrode made of a Pt/C+WSi$_2$ composite material in its as-prepared state and after 1000 cycles. The mass ratio of Pt/C to WSi$_2$ of this working composite electrode was 1:1.
Figure 20:
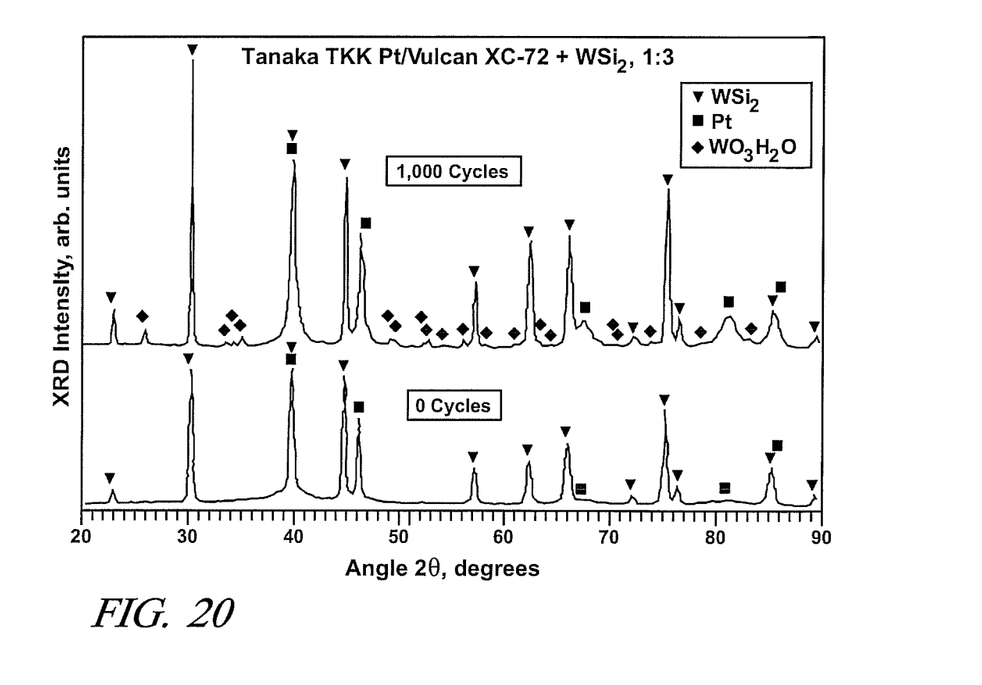
FIG. 20 is an XRD pattern for a working electrode made of a Pt/C+WSi$_2$ composite material in its as-prepared state and after 1000 cycles. The mass ratio of Pt/C to WSi$_2$ of this working composite electrode was 1:3.

FIGS. 18, 19, and 20 show the XRD data for the 3:1, 1:1, and 1:3 mass ratio $WSi_2$ working electrodes, respectively. In each of the 3:1 and 1:1 mass ratio $WSi_2$ working electrodes (FIGS. 18 and 19), no crystalline tungsten oxide phases were detected after 1000 cycles. The average Pt crystallite size after cycling for the 3:1 and 1:1 mass ratio $WSi_2$ working electrodes were estimated at 6.8 nm and 5.7 nm, respectively. The 1:3 mass ratio $WSi_2$ electrode, however, provided slightly different XRD data than the other two electrodes. This composite working electrode, before cycling, matched reference data for Pt metal and $WSi_2$. But after cycling several new diffraction peaks that correspond with those from tungsten acid ($WO_3.H_2O$) were noticed. The formation of tungsten acid suggests that a significant amount of $WSi_2$ is oxidized during cycling, which may account for the HAD area increase observed for this working electrode in FIG. 15. The platinum metal diffraction peaks intensities of the 1:3 mass ratio $WSi_2$ working electrode increased and sharpened with cycling similar to the 3:1 and 1:1 $WSi_2$ electrodes. The average platinum crystallite size after 1000 cycles was estimated at 6.6 nm using the Scherrer equation.

The above galvanostatic and potential cycling experiments reveal that composite anodes containing catalyst-loaded carbon particles admixed with tungsten oxide particles and/or tungsten silicide particles may be useful to help combat the possible adverse effects associated with hydrogen starvation in PEM fuel cells. The ability of these tungsten-containing compounds to temporarily delay an anodic potential excursion during disruptions of hydrogen gas flow can postpone the corrosion of the carbon support materials located in the cathode. This provides a much needed and ample time frame in which the hydrogen gas flow problem can be rectified before significant performance degradations occur in the PEM fuel cell's MEA.

The above description of embodiments of the invention is merely exemplary in nature and, thus, variations thereof are not to be regarded as a departure from the spirit and scope of the invention.

The invention claimed is:

1. A proton exchange membrane fuel cell configured to receive hydrogen gas as the fuel and oxygen gas or air as an oxidant, the fuel cell comprising:
   a proton exchange membrane having an anode side and an opposing cathode side, the membrane being conductive of protons from the anode side to the cathode side of the membrane;
   a cathode disposed on the cathode side of the proton exchange membrane which is configured to receive an oxygen or air flow; and
   an anode material coating layer disposed on the anode side of the proton exchange membrane which is configured to receive a hydrogen flow, the anode material coating layer comprising: (a) particles of a platinum catalyst material supported on particles of carbon for the oxidation of hydrogen to protons and electrons, and (b) tungsten-containing particles comprising $WO_3$ physically mixed with the carbon-supported platinum catalyst particles in a mass ratio in the range of about one part to about three parts tungsten-containing particles per part of the carbon-supported platinum catalyst particles, the tungsten-containing particles being employed for storage of hydrogen during hydrogen flow to the anode material coating layer and release of the hydrogen to the carbon-supported platinum catalyst particles upon an interruption of the hydrogen flow to a portion of the anode material coating layer.

2. A proton exchange membrane fuel cell as recited in claim 1 in which the tungsten-containing particles comprise $WO_3$ and $WSi_2$.

3. A proton exchange membrane fuel cell configured to receive a fuel of hydrogen gas and an oxidant of oxygen or air, the fuel cell comprising:
   a proton exchange membrane having an anode side and an opposing cathode side, the membrane being conductive of protons from the anode side to the cathode side of the membrane;
   a cathode layer disposed on the cathode side of the proton exchange membrane which is configured to receive an oxygen or air flow, the cathode layer comprising carbon particles; and
   an anode layer disposed on the anode side of the proton exchange membrane which is configured to receive a hydrogen flow, the anode layer comprising: (a) particles of a platinum catalyst supported on particles of carbon, and (b) tungsten-containing particles comprising $WO_3$ mixed with the carbon-supported platinum catalyst particles in a mass ratio of about 1:1,
   the tungsten-containing particles being present to store a sufficient amount of hydrogen at the anode layer when the hydrogen flow is supplied to the anode layer and also to release a sufficient amount of hydrogen to the platinum catalyst particles during temporary periods of hydrogen starvation so that corrosion of the carbon particles in the cathode layer is delayed.

4. A proton exchange membrane fuel cell as recited in claim 3 in which the tungsten-containing particles comprise $WO_3$ and $WSi_2$.

5. A proton exchange membrane fuel cell as recited in claim 3 in which the carbon-supported platinum catalyst particles comprise 46.7 wt. % platinum.

* * * * *